US012808028B2

(12) United States Patent
Mitsunobu et al.

(10) Patent No.: US 12,808,028 B2
(45) Date of Patent: Nov. 24, 2026

(54) PLATED STEEL SHEET

(71) Applicant: NIPPON STEEL CORPORATION, Tokyo (JP)

(72) Inventors: Takuya Mitsunobu, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/727,014

(22) PCT Filed: Dec. 21, 2022

(86) PCT No.: PCT/JP2022/047101
§ 371 (c)(1),
(2) Date: Jul. 5, 2024

(87) PCT Pub. No.: WO2023/132240
PCT Pub. Date: Jul. 13, 2023

(65) Prior Publication Data

US 2025/0092500 A1 Mar. 20, 2025

(30) Foreign Application Priority Data

Jan. 6, 2022 (JP) ................................. 2022-001123

(51) Int. Cl.

| | |
|---|---|
| ***C23C 2/06*** | (2006.01) |
| ***B32B 15/01*** | (2006.01) |
| ***B32B 15/04*** | (2006.01) |
| ***B32B 15/18*** | (2006.01) |
| ***C21D 9/46*** | (2006.01) |
| ***C22C 18/00*** | (2006.01) |
| ***C22C 18/04*** | (2006.01) |
| ***C22C 38/00*** | (2006.01) |
| ***C22C 38/08*** | (2006.01) |
| ***C22C 38/18*** | (2006.01) |
| ***C22C 38/20*** | (2006.01) |
| ***C22C 38/22*** | (2006.01) |
| ***C22C 38/26*** | (2006.01) |
| ***C22C 38/28*** | (2006.01) |
| ***C22C 38/32*** | (2006.01) |
| ***C22C 38/40*** | (2006.01) |

(Continued)

(52) U.S. Cl.
CPC .............. *C23C 2/06* (2013.01); *B32B 15/013* (2013.01); *B32B 15/04* (2013.01); *B32B 15/043* (2013.01); *B32B 15/18* (2013.01); *C21D 9/46* (2013.01); *C22C 18/00* (2013.01); *C22C 18/04* (2013.01); *C22C 38/007* (2013.01); *C22C 38/08* (2013.01); *C22C 38/18* (2013.01); *C22C 38/20* (2013.01); *C22C 38/22* (2013.01); *C22C 38/26* (2013.01); *C22C 38/28* (2013.01); *C22C 38/32* (2013.01); *C22C 38/40* (2013.01); *C22C 38/42* (2013.01); *C22C 38/44* (2013.01); *C22C 38/48* (2013.01); *C22C 38/50* (2013.01); *C22C 38/54* (2013.01); *C23C 2/02* (2013.01); *C23C 2/0224* (2022.08); *C23C 2/024* (2022.08); *C23C 2/26* (2013.01); *C23C 2/28* (2013.01); *C23C 2/29* (2022.08); *C23C 2/40* (2013.01); *C23C 28/025* (2013.01); *C23C 28/3225* (2013.01); *C23C 30/00* (2013.01); *C23C 30/005* (2013.01); *B32B 2311/20* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/16* (2013.01); *C22C 38/60* (2013.01); *Y10T 428/12799* (2015.01); *Y10T 428/12993* (2015.01)

(58) Field of Classification Search
CPC ........... C23C 2/06; C23C 2/02; C23C 2/0224; C23C 2/024; C23C 2/26; C23C 2/28; C23C 2/29; C23C 2/40; C23C 30/00; C23C 30/005; C23C 28/025; C23C 28/3225; B32B 15/013; B32B 15/04; B32B 15/043; B32B 15/18; B32B 2311/20; C21D 9/46; C22C 18/00; C22C 18/04; C22C 38/002; C22C 38/005; C22C 38/007; C22C 38/008; C22C 38/02; C22C 38/04; C22C 38/06; C22C 38/08; C22C 38/10; C22C 38/12; C22C 38/14; C22C 38/16; C22C 38/18; C22C 38/20; C22C 38/22; C22C 38/26; C22C 38/28; C22C 38/32; C22C 38/40; C22C 38/42; C22C 38/44; C22C 38/48; C22C 38/50; C22C 38/54; C22C 38/60; Y10T 428/12799; Y10T 428/12993
See application file for complete search history.

(56) References Cited

U.S. PATENT DOCUMENTS

| | | | |
|---|---|---|---|
| 2011/0256420 | A1 | 10/2011 | Li et al. |
| 2018/0371598 | A1 | 12/2018 | Kim |
| 2019/0003009 | A1 | 1/2019 | Kawata et al. |

FOREIGN PATENT DOCUMENTS

| | | | |
|---|---|---|---|
| JP | 2002-212699 | A | 7/2002 |
| JP | 3600804 | B2 | 12/2004 |

(Continued)

*Primary Examiner* — Michael E. La Villa
(74) *Attorney, Agent, or Firm* — Birch, Stewart, Kolasch & Birch, LLP

(57) ABSTRACT

Provided is a plated steel sheet comprising a base steel sheet and a plating layer formed on a surface of the base steel sheet, wherein the plating layer has a predetermined chemical composition, and when measuring the plating layer by X-ray diffraction, a peak intensity I(002) derived from a (002) plane of an $\eta$ phase and a peak intensity I(101) derived from a (101) plane of the $\eta$ phase satisfy $0 < I(002)/I(101) \leq 1000$.

6 Claims, No Drawings

(51) Int. Cl.

| | |
|---|---|
| ***C22C 38/42*** | (2006.01) |
| ***C22C 38/44*** | (2006.01) |
| ***C22C 38/48*** | (2006.01) |
| ***C22C 38/50*** | (2006.01) |
| ***C22C 38/54*** | (2006.01) |
| ***C23C 2/02*** | (2006.01) |
| ***C23C 2/26*** | (2006.01) |
| ***C23C 2/28*** | (2006.01) |
| ***C23C 2/40*** | (2006.01) |
| ***C23C 28/00*** | (2006.01) |
| ***C23C 28/02*** | (2006.01) |
| ***C23C 30/00*** | (2006.01) |
| *C22C 38/02* | (2006.01) |
| *C22C 38/04* | (2006.01) |
| *C22C 38/06* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/60* | (2006.01) |

(56) References Cited

FOREIGN PATENT DOCUMENTS

| | | | |
|---|---|---|---|
| JP | 2011-529527 | A | 12/2011 |
| JP | 2018-538446 | A | 12/2018 |
| JP | 2021-85086 | A | 6/2021 |
| KR | 10-2018-0088707 | A | 8/2018 |

PLATED STEEL SHEET

FIELD

The present invention relates to a plated steel sheet.

BACKGROUND

It is known that Zn-based plated steel sheet exhibits a sacrificial corrosion prevention action and has excellent corrosion resistance. In the prior art, to further improve the corrosion resistance of such Zn-based plated steel sheet, it has been proposed to add Al and other elements to the plating layer.

In relation to this, PTL 1 describes a hot dip plated steel sheet comprising a steel sheet and a hot dip plating layer formed on the surface of the steel sheet, wherein the hot dip plating layer contains, by average composition, Al: 0 to 90 mass %, Mg: 0 to 10 mass %, and a balance of Zn and impurities, the hot dip plating layer is formed with pattern parts arranged so as to give a predetermined shape and nonpattern parts, the pattern parts and the nonpattern parts respectively include one or both of first regions and second regions, an absolute value of a difference between an area ratio of the first regions at the pattern parts and an area ratio of the first regions at the nonpattern parts is 30% or more, the first regions are regions with an orientation rate, corresponding to an intensity ratio ($I_{0\ 0\ 0\ 2}/I_{1\ 0\text{-}1\ 1}$) between a diffraction peak intensity $I_{0\ 0\ 0\ 2}$ of a (0002) plane of the Zn phase and a diffraction peak intensity $I_{1\ 0\text{-}1\ 1}$ of a (10-11) plane of the Zn phase, of 3.5 or more, and the second regions are regions with the orientation rate of less than 3.5. Further, PTL 1 describe that according to the above constitution, it is possible to provide a hot dip plated steel sheet excellent in the durability of any letters, designs, etc., formed on the surface of the hot dip plating layer and, further, excellent in corrosion resistance as well.

PTL 2 describes a hot dip Zn—Al-based alloy plated steel sheet comprised of a steel sheet provided with a hot dip Zn—Al-based alloy plating film on at least one surface of the base material, wherein the plating film has a chemical composition comprising, by mass %, Al in 3.5% or more and 10% or less, Mg in 0.01% or more and 0.50% or less, and a balance of Zn and unavoidable impurities, the contents of Pb, Sn, Cd, and Bi as unavoidable impurities is, in total, 0.020% or less, the Fe content contained in the plating film is 0.5 g/m$^2$ or less, an average diameter of the spangles is 2.0 mm or less, and an orientation index of a Zn(00·2) plane parallel to the plating surface is less than 3.5. Further, PTL 2 describes that the above hot dip Zn—Al-based alloy plated steel sheet has a smooth surface free of tortoise shell patterns, has small spangles and is excellent in aesthetic appearance, and, further, is excellent in the workability of the plating film, and therefore not only the flat plate part, but also the worked parts have excellent corrosion resistance.

CITATIONS LIST

Patent Literature

[PTL 1] Japanese Unexamined Patent Publication No. 2021-085086

[PTL 2] Japanese Unexamined Patent Publication No. 2002-212699

SUMMARY

Technical Problem

In a plated steel sheet, various properties are sought in addition to corrosion resistance. For example, in the fields of automobiles, etc., a plated steel sheet is asked to provide a high cold workability, in particular, press-formability or improved chemical convertibility. To improve the press-formability of the plated steel sheet, it is effective to raise the lubrication ability of the plating layer so as to reduce the dynamic friction coefficient between the plated steel sheet and the dies. On the other hand, if adding a relatively large amount of Al into the plating layer, sometimes the surface of the plating layer is excessively formed with an alumina film. In such a case, there is the problem of the chemical convertibility falling.

The present invention was made in consideration of such a situation and has as its object the provision of a plated steel sheet having improved lubrication ability and chemical convertibility by a novel constitution.

Solution to Problem

The inventors engaged in studies so as to improve the lubrication ability and chemical convertibility of a plated steel sheet, in particular focusing on the chemical composition and structure of the plating layer. As a result, the inventors discovered that by making the Al content in the plating layer relatively low, it is possible to improve the chemical convertibility of the plated steel sheet, while by controlling the orientation of the η phase mainly comprised of Zn in that plating layer to within a predetermined range, it is possible to remarkably improve the lubrication ability of the plated steel sheet, and thereby completed the present invention.

The present invention able to achieve this object is as follows:

(1) A plated steel sheet comprising a base steel sheet and a plating layer formed on a surface of the base steel sheet, wherein the plating layer has a chemical composition comprising, by mass %,
Al: 0.10 to 1.50% and
Fe: 0.01 to 2.00%,
further comprising at least one of
Mg: 0 to 1.500%,
Si: 0 to 1.000%,
Ni: 0 to 1.000%,
Ca: 0 to 4.000%,
Sb: 0 to 0.500%,
Pb: 0 to 0.500%,
Cu: 0 to 1.000%,
Sn: 0 to 1.000%,
Ti: 0 to 1.000%,
Cr: 0 to 1.000%,
Nb: 0 to 1.000%,
Zr: 0 to 1.000%,
Mn: 0 to 1.000%,
Mo: 0 to 1.000%,
Ag: 0 to 1.000%,
Li: 0 to 1.000%,
La: 0 to 0.500%,
Ce: 0 to 0.500%,
B: 0 to 0.500%,
Y: 0 to 0.500%,
P: 0 to 0.500%, and
Sr: 0 to 0.500% in a total of 5.000% or less, and a balance of Zn and impurities, and when measuring the plating layer by X-ray diffraction, a peak intensity I(002) derived from a (002) plane of an η phase and a peak intensity I(101) derived from a (101) plane of the η phase satisfy 0<I(002)/I(101) ≤1000.

(2) The plated steel sheet according to (1), wherein the chemical composition comprises, by mass %, Al: 0.30 to 1.50% and, when measuring the plating layer by X-ray diffraction, the peak intensity I(002) and the peak intensity I(101) satisfy 0<I(002)/I(101)≤500.

(3) The plated steel sheet according to (1), wherein the chemical composition comprises, by mass %, Al: 0.30 to 1.50% and, when measuring the plating layer by X-ray diffraction, the peak intensity I(002) and the peak intensity I(101) satisfy 0<I(002)/I(101)≤50.

(4) The plated steel sheet according to any one of (1) to (3), wherein the plating layer is a hot dip galvanized (GI) layer.

Advantageous Effects of Invention

According to the present invention, it is possible to provide a plated steel sheet having improved lubrication ability and chemical convertibility.

DESCRIPTION OF EMBODIMENTS

The plated steel sheet according to the embodiment of the present invention comprises a base steel sheet and a plating layer formed on a surface of the base steel sheet, wherein the plating layer has a chemical composition comprising, by mass %, Al: 0.10 to 1.50% and
Fe: 0.01 to 2.00%,
further comprising at least one of
Mg: 0 to 1.500%,
Si: 0 to 1.000%,
Ni: 0 to 1.000%,
Ca: 0 to 4.000%,
Sb: 0 to 0.500%,
Pb: 0 to 0.500%,
Cu: 0 to 1.000%,
Sn: 0 to 1.000%,
Ti: 0 to 1.000%,
Cr: 0 to 1.000%,
Nb: 0 to 1.000%,
Zr: 0 to 1.000%,
Mn: 0 to 1.000%,
Mo: 0 to 1.000%,
Ag: 0 to 1.000%,
Li: 0 to 1.000%,
La: 0 to 0.500%,
Ce: 0 to 0.500%,
B: 0 to 0.500%,
Y: 0 to 0.500%,
P: 0 to 0.500%, and
Sr: 0 to 0.500% in a total of 5.000% or less, and
a balance of Zn and impurities, and when measuring the plating layer by X-ray diffraction, a peak intensity I(002) derived from a (002) plane of an η phase and a peak intensity I(101) derived from a (101) plane of the η phase satisfy 0<I(002)/I(101) ≤1000.

By adding Al in the plating layer to include alumina ($Al_2O_3$), it is possible to improve the lubrication ability of the plating layer, but as explained above, if adding a relatively large amount of Al in the plating layer, sometimes the surface of the plating layer is excessively formed with an alumina film. In such a case, there is the problem that the chemical convertibility falls. The chemical conversion forms a film by etching a treated object by an acid or other treatment solution. Therefore, if a thick alumina film stable against such a treatment solution is present, the chemical convertibility will fall. On the other hand, in the automobile and other fields, excellent cold workability, in particular press-formability, is sought. In relation to this, in press-forming, if the dynamic friction coefficient between the plated steel sheet and dies is high, the load required for press-forming will become higher and sometimes will lead to fracture of the plated steel sheet, etc. Therefore, to improve the press-formability, it is effective to raise the lubrication ability of the plated steel sheet to reduce the dynamic friction coefficient between the plated steel sheet and dies. Therefore, the inventors focused on the chemical composition and structure of the plating layer at the plated steel sheet so as to improve the lubrication ability and chemical convertibility of the plated steel sheet and conducted studies from the viewpoint of making these more suitable.

First, the inventors discovered that by adding Al in a relatively small amount, i.e., an amount of 0.10 to 1.50 mass %, in a plating layer mainly comprised of Zn, it is possible to secure the effect of improvement of the lubrication ability by addition of Al while suppressing the reduction in chemical convertibility due to the excessive formation of an alumina film, etc. Furthermore, the inventors discovered that, in relation to such a plating layer mainly comprised of Zn, by controlling the orientation of the η phase forming the main phase in the plating layer to within a predetermined range, more specifically, when measuring the plating layer by X-ray diffraction, by controlling a peak intensity I(002) derived from the (002) plane of the η phase and the peak intensity I(101) derived from the (101) plane of the η phase so as to satisfy 0<I(002)/I(101)≤1000, it is possible to remarkably improve the lubrication ability of the plated steel sheet. In the present invention, the "η phase" means the phase mainly comprised of Zn and containing Fe and other elements in a dissolved state, more specifically means the phase having a Zn concentration of 97% or more, an Fe concentration of 3% or less, and other elements in 3% or less when measured by a scan electron microscope equipped with an energy dispersive X-ray spectroscope (SEM-EDS).

While not intending to be bound to any specific theory, it is believed that the (002) plane of the η phase in the plating layer acts in a direction raising the dynamic friction coefficient between the plated steel sheet and the dies. Therefore, it is believed that by raising the ratio of the (101) plane of the η phase in the plating layer and in relation to this lowering the ratio of the (002) plane of the η phase in the plating layer, i.e., by limiting the relationship of the peak intensity I(002) derived from the (002) plane of the η phase and the peak intensity I(101) derived from the (101) plane of the η phase to within a range of 0<I(002)/I(101)≤1000, it is possible to reduce the dynamic friction coefficient between the plated steel sheet and the dies. As a result, it is possible to remarkably raise the lubrication ability of the plated steel sheet. For example, even in the case of a high strength plated steel sheet, it is possible to sufficiently reduce the load in the press-forming operation and is possible to realize the desired press-forming without causing fractures or other problems. The fact that the physical properties of steel materials are dependent on the crystal orientation can be understood by persons skilled the art, but in the case of conventional Zn-based plated steel sheet, the ratio of orientation of the (002) plane of the η phase is extremely high and I(002)/I (101) often exceeds 10000. Therefore, the fact that by controlling the ratio of the (002) plane of the η phase in the plating layer to a relatively low range in relation to the (101) plane, i.e., by changing from the mainly (002) plane orientation in the prior art to randomized orientations including the (002) plane and (101) plane, it is possible to raise the lubrication ability of the plated steel sheet, was not known in the past and was first made clear this time by the inventors.

Below, the plated steel sheet according to an embodiment of the present invention will be explained in more detail. In the following explanation, the "%" of the units of content of the elements, unless otherwise indicated, means "mass %". Further, in this Description, "to" showing a numerical range, unless otherwise indicated, is used in the sense including the numerical values described before and after it as the lower limit value and upper limit value.

[Plating Layer]

According to an embodiment of the present invention, a plating layer is formed on a surface of the base steel sheet. For example, it is formed on at least one surface, preferably both surfaces, of the base steel sheet. The plating layer has the following chemical composition.

[Al: 0.10 to 1.50%]

Al is an element effective for forming alumina and improving the lubrication ability of the plating layer. To sufficiently obtain such an effect, the Al content is 0.10% or more. The Al content may also be 0.12% or more, 0.15% or more, 0.18% or more, 0.20% or more, 0.25% or more, 0.30% or more, 0.35% or more, or 0.40% or more. On the other hand, if excessively containing Al, the surface of the plating layer will be excessively formed with an alumina film and sometimes the chemical convertibility of the plated steel sheet will fall. Therefore, the Al 15 content is 1.50% or less. The Al content may also be 1.45% or less, 1.40% or less, 1.30% or less, 1.20% or less, 1.10% or less, or 1.00% or less. From the viewpoint of better improving the chemical convertibility, the Al content is preferably 0.90% or less, more preferably 0.80% or less.

[Fe: 0.01 to 2.00%]

Fe is, for example, an element which dissolves out from the base steel sheet into the plating bath or which, at the time of plating treatment, reacts with the Al to form an Fe—Al barrier layer at the interface of the base steel sheet and the plating layer and thus is unavoidably contained in the plating layer. For this reason, in the plated steel sheet according to an embodiment of the present invention, the Fe content in the plating layer becomes 0.01% or more. The Fe content may also be 0.05% or more, 0.10% or more, 0.15% or more, 0.20% or more, 0.25% or more, 0.30% or more, 0.40% or more or 0.50% or more. On the other hand, if the Fe content in the plating layer is too high, much of the Al in the plating layer bonds with the Fe and, as a result, sometimes the effect of improvement of the lubrication ability of the plated steel sheet by the 30 addition of Al can no longer be sufficiently exhibited. Therefore, the Fe content is 2.00% or less. The Fe content may also be 1.80% or less, 1.60% or less, 1.50% or less, 1.30% or less, 1.20% or less, 1.00% or less, 0.90% or less, 0.80% or less, 0.70% or less, or 0.60% or less.

The basic chemical composition of the plating layer is as explained above. Furthermore, the plating layer may optionally contain at least one of Mg: 0 to 1.500%, Si: 0 to 1.000%, Ni: 0 to 1.000%, Ca: 0 to 4.000%, Sb: 0 to 0.500%, Pb: 0 to 0.500%, Cu: 0 to 1.000%, Sn: 0 to 1.000%, Ti: 0 to 1.000%, Cr: 0 to 1.000%, Nb: 0 to 1.000%, Zr: 0 to 1.000%, Mn: 0 to 1.000%, Mo: 0 to 1.000%, Ag: 0 to 1.000%, Li: 0 to 1.000%, La: 0 to 0.500%, Ce: 0 to 0.500%, B: 0 to 0.500%, Y: 0 to 0.500%, P: 0 to 0.500%, and Sr: 0 to 0.500%. These optional elements are included in a total of 5.000% or less from the viewpoint of sufficiently obtaining the actions and functions of the basic constituents forming the plating layer, in particular the Al. The optional elements may be included in a total of 4.500% or less, 4.000% or less, 3.500% or less, 3.000% or less, 2.500% or less, 2.000% or less, 1.500% or less, or 1.000% or less. Below, these optional elements will be explained in detail.

[Mg: 0 to 1.500%]

Mg is an element effective for improving the corrosion resistance of the plating layer. The Mg content may be 0%, but to obtain such an effect, the Mg content is preferably 0.001% or more. The Mg content may also be 0.010% or more, 0.050% or more, or 0.100% or more. On the other hand, if excessively containing Mg, sometimes a large number of the brittle compound MgZn-based compounds is formed in the plating layer. These can become causes for a drop in workability. Therefore, the Mg content is preferably 1.500% or less. The Mg content may also be 1.200% or less, 1.000% or less, 0.800% or less, 0.500% or less, 0.400% or less, 0.300% or less, or 0.200% or less.

[Si: 0 to 1.000%]

Si is an element effective for improving the corrosion resistance of the plating layer. The Si content may be 0%, but Si may also be contained in the plating layer in an amount of 0.0001% or more or 0.001% or more, if necessary. On the other hand, if excessively containing Si, sometimes the plating adhesion of the plating layer will fall. Therefore, the Si content is preferably 1.000% or less. The Si content may also be 0.800% or less, 0.500% or less, 0.100% or less, or 0.050% or less.

[Ni: 0 to 1.000%]

Ni is an element effective for improving the corrosion resistance of the plating layer. The Ni content may be 0%, but to obtain such an effect, the Ni content is preferably 0.001% or more. The Ni content may also be 0.005% or more, 0.010% or more, or 0.020% or more. On the other hand, if excessively containing Ni, sometimes a large amount of intermetallic compounds will be formed and the corrosion resistance will fall. Therefore, the Ni content is preferably 1.000% or less. The Ni content may also be 0.800% or less, 0.600% or less, or 0.400% or less.

[Ca: 0 to 4.000%]

Ca is an element effective for securing the wettability of the plating bath. The Ca content may be 0%, but to obtain such an effect, the Ca content is preferably 0.001% or more. The Ca content may also be 0.010% or more, 0.100% or more, or 1.000% or more. On the other hand, if excessively containing Ca, sometimes a large amount of hard intermetallic compounds will be formed in the plating layer, the plating layer will become brittle, and adhesion with the steel sheet will fall. Therefore, the Ca content is preferably 4.000% or less. The Ca content may also be 3.000% or less, 2.000% or less, or 1.500% or less.

[Sb: 0 to 0.500%, Pb: 0 to 0.500%, Cu: 0 to 1.000%, Sn: 0 to 1.000%, Ti: 0 to 1.000%, Cr: 0 to 1.000%, Nb: 0 to 1.000%, Zr: 0 to 1.000%, Mn: 0 to 1.000%, Mo: 0 to 1.000%, Ag: 0 to 1.000%, Li: 0 to 1.000%, La: 0 to 0.500%, Ce: 0 to 0.500%, B: 0 to 0.500%, Y: 0 to 0.500%, P: 0 to 0.500%, and Sr: 0 to 0.500%]

Sb, Pb, Cu, Sn, Ti, Cr, Nb, Zr, Mn, Mo, Ag, Li, La, Ce, B, Y, P, and Sr need not be included in the plating layer, but can be present in the plating layer in amounts of 0.0001% or more or 0.001% or more. These elements do not detrimentally affect the performance as a plated steel sheet if within the predetermined ranges of content. However, if the contents of the elements are excessive, sometimes the corrosion resistance will fall. Therefore, the contents of Sb, Pb, La, Ce, B, Y, P, and Sr are preferably 0.500% or less. For example, they may also be 0.300% or less, 0.100% or less, or 0.050% or less. Similarly, the contents of Cu, Sn, Ti, Cr, Nb, Zr, Mn, Mo, Ag, and Li are preferably 1.000% or less, for example, may be 0.800% or less, 0.500% or less, or 0.100% or less.

In the plating layer, the balance besides the above elements is comprised of Zn and impurities. The "impurities" in the plating layer are constituents, etc., entering during to various factors in the production process, such as raw materials, when producing the plating layer.

The chemical composition of the plating layer can be determined by dissolving the plating layer in an acid solution to which an inhibitor suppressing corrosion of the base steel sheet is added and measuring the obtained solution by ICP (high frequency inductively coupled plasma) spectrometry.

The plating layer may be any plating layer having the above chemical composition and is not particularly limited, but, for example, is preferably a hot dip galvanized (GI) layer. Further, the thickness of the plating layer may be, for example, 3 to 50 μm. The amount of deposition of the plating layer is not particularly limited, but, for example, may be 10 to 170 $g/m^2$ per surface. The amount of deposition of the plating layer is determined by dissolving the plating layer in an acid solution to which an inhibitor suppressing corrosion of the base steel sheet is added and finding the change in weight before and after pickling.

[Peak Intensity I(002) Derived From (002) Plane of η Phase and Peak Intensity I(101) Derived from (101) Plane of η Phase: 0<I(002)/I(101)≤1000]

In an embodiment of the present invention, when measuring the plating layer by X-ray diffraction, the peak intensity I(002) derived from the (002) plane of the η phase and the peak intensity I(101) derived from the (101) plane of the η phase satisfy 0<I(002)/I(101)≤1000. As explained above, it is believed that the (002) plane of the η phase at the plating layer acts in a direction raising the dynamic friction coefficient between the plated steel sheet and the dies. Therefore, when measured by X-ray diffraction, by controlling the I(002)/I(101) to such a range to make the ratio of the (002) plane of the η phase relatively lower, i.e., randomized orientations including the (002) plane and (101) plane of the η phase, it is possible to remarkably raise the lubrication ability of the plated steel sheet. As a result, it is possible to improve the press-formability of the plated steel sheet. From the viewpoint of better improving the lubrication ability of the plated steel sheet, the smaller the I(002)/I(101) intensity ratio, the better. It is preferably 800 or less, more preferably 500 or less or 300 or less, most preferably 100 or less or 50 or less. The I(002)/I(101) intensity ratio can by reduced by increasing the Al content in the plating layer while applying the method of production of plated steel sheet explained in detail later. For example, to make the I(002)/I(101) intensity ratio 500 or less, in particular 50 or less, the Al content in the plating layer is preferably 0.30% or more. On the other hand, it is difficult production wise to make the I(002)/I(101) intensity ratio 0 (zero), and therefore the I(002)/I(101) intensity ratio is more than 0, for example, may be 1 or more, 3 or more, 5 or more, 8 or more, or 10 or more.

[Method of Measurement of I(002)/I(101) by X-Ray Diffraction]

The I(002)/I(101) intensity ratio is determined in the following way. First, a plated steel sheet sample cut out from the plated steel sheet to a 50 mm×30 mm size is obtained, then the plated steel sheet sample is measured by X-ray diffraction (tube: Cu, acceleration voltage: 15 kV, steps: 0.1°, 2θ: 20 to 60°) so as to measure the peak intensity I(002)(cps) of the peak derived from the (002) plane of the η phase detected in the range of 2θ=36.1 to 36.3° and the peak intensity I(101)(cps) of the peak derived from the (101) plane of the η phase detected in the range of 2θ=43.1 to 43.3° and determine the value of I(002)/I(101).

[Base Steel Sheet]

In an embodiment of the present invention, the base steel sheet for forming the above plating layer is not particularly limited and may be any suitable material. The base steel sheet may be a material having any tensile strength. It may be a material having a relatively low tensile strength or may be a material having a relatively high tensile strength, for example, a material having a chemical composition giving a tensile strength of the plated steel sheet of 780 MPa or more. In general, the higher strength a steel sheet is made, the more the press-formability falls. However, the plated steel sheet according to the embodiment of the present invention has a high lubrication ability, and therefore, for example, even if having a relatively high tensile strength of 780 MPa or more or 980 MPa or more, it is possible to sufficiently reduce the load in the press-forming operation compared with the case of a conventional plated steel sheet having the same tensile strength. For this reason, the desired press-forming can be realized without causing fracture or other problems.

[Preferable Chemical Composition of Base Steel Sheet]

The present invention, as explained above, has as its object to provide a plated steel sheet having improved lubrication ability and chemical convertibility and achieves this object by forming on the surface of a base steel sheet a plating layer having a predetermined chemical composition and satisfying 0<I(002)/I(101)≤1000 when measured by X-ray diffraction. Therefore, it is clear that the chemical composition itself of the base steel sheet is not a technical feature essential in achieving the object of the present invention. Below, the preferable chemical composition of the base steel sheet used in the plated steel sheet according to the embodiment of the present invention will be explained in detail, but the explanations relate in general to the base steel sheet for a high strength plated steel sheet difficult to press-form, more specifically a plated steel sheet having a tensile strength of 780 MPa or more. Therefore, this is intended as a simple illustration of the preferable chemical composition of a base steel sheet able to be effectively applied in the plated steel sheet having an improved lubrication ability according to the present invention. Therefore, the explanations are not intended to limit the present invention to one using a base steel sheet having such a specific chemical composition.

In an embodiment of the present invention, for example, the base steel sheet preferably has a chemical composition comprising, by mass %, C: 0.01 to 0.50%,
Si: 0.01 to 3.50%,
Mn: 0.10 to 5.00%,
P: 0.100% or less,
S: 0.0300% or less,
N: 0.0100% or less,
O: 0 to 0.020%,
Al: 0 to 1.000%,
B: 0 to 0.010%,
Nb: 0 to 0.150%,
Ti: 0 to 0.20%,
Mo: 0 to 3.00%, Cr: 0 to 2.00%,
V: 0 to 1.00%,
Ni: 0 to 2.00%,
W: 0 to 1.00%,
Ta: 0 to 0.10%,
Co: 0 to 3.00%,
Sn: 0 to 1.00%,
Sb: 0 to 0.50%,
Cu: 0 to 2.00%,
As: 0 to 0.050%,
Mg: 0 to 0.100%,
Ca: 0 to 0.100%,
Zr: 0 to 0.100%,
Hf: 0 to 0.100%,
REM: 0 to 0.10, and
a balance: Fe and impurities. Below, the elements will be explained in more detail.

[C: 0.01 to 0.50%]

C is an element increasing the tensile strength inexpensively and an element important for controlling the strength of steel. To sufficiently obtain such an effect, the C content is preferably 0.01% or more. The C content may also be 0.05% or more, 0.10% or more, or 0.15% or more. On the other hand, if excessively containing C, sometimes a drop in elongation is invited. For this reason, the C content is preferably 0.50% or less. The C content may also be 0.40% or less, 0.35% or less, or 0.30% or less.

[Si: 0.01 to 3.50%]

Si is an element acting as a deoxidizer and suppressing the precipitation of carbides in the cooling process during annealing of a cold rolled sheet. To sufficiently obtain such an effect, the Si content is preferably 0.01% or more. The Si content may also be 0.10% or more, 0.30% or more, or 0.80% or more. On the other hand, if excessively including Si, sometimes a drop in elongation is invited along with an increase in steel strength. For this reason, the Si content is preferably 3.50% or less. The Si content may also be 2.50% or less, 2.00% or less, or 1.50% or less.

[Mn: 0.10 to 5.00%]

Mn is an element affecting the ferrite transformation of steel and an element effective for raising the strength. To sufficiently obtain such an effect, the Mn content is preferably 0.10% or more. The Mn content may also be 0.50% or more, 1.00% or more, or 1.50% or more. On the other hand, if excessively including Mn, sometimes a drop in elongation is invited along with an increase in steel strength. For this reason, the Mn content is preferably 5.00% or less. The Mn content may also be 4.00% or less, 3.00% or less, or 2.50% or less.

[P: 0.100% or Less]

P is an element precipitating at the grain boundaries and promoting embrittlement of the steel. The P content is preferably as small as possible, and therefore ideally is 0%. However, excessive reduction of the P content sometimes invites a large increase in costs. For this reason, the P content may be 0.0001% or more and may be 0.001% or more or 0.005% or more. On the other hand, if excessively including P, as explained above, sometimes embrittlement of the steel is invited due to grain boundary segregation. Therefore, the P content is preferably 0.100% or less. The P content may also be 0.050% or less, 0.030% or less, or 0.010% or less.

[S: 0.0300% or Less]

S is an element forming MnS and other nonmetallic inclusions in steel and inviting a drop in ductility of the steel part. The S content is preferably as small as possible, and therefore ideally is 0%. However, excessive reduction of the S content sometimes invites a large increase in costs. For this reason, the S content may be 0.0001% or more and may be 0.0002% or more, 0.0010% or more, or 0.0050% or more. On the other hand, if excessively including S, sometimes cracks are invited starting from the nonmetallic inclusions at the time of cold forming. Therefore, the S content is preferably 0.0300% or less. The S content may also be 0.0200% or less, 0.0150% or less, or 0.0100% or less.

[N: 0.0100% or Less]

N is an element forming coarse nitrides in a steel sheet and lowering the workability of a steel sheet. The N content is preferably as small as possible, and therefore ideally is 0%. However, excessive reduction of the N content sometimes invites a large increase in costs. For this reason, the N content may be 0.0001% or more and may be 0.0005% or more or 0.0010% or more. On the other hand, if excessively including N, as explained above, sometimes coarse nitrides are formed and the workability of a steel sheet is lowered. Therefore, the N content is preferably 0.0100% or less. The N content may also be 0.0080% or less or 0.0050% or less.

The preferable basic chemical composition of the base steel sheet is as explained above. Furthermore, the base steel sheet may, if necessary, contain one or more selected from the group consisting of O: 0 to 0.020%, Al: 0 to 1.000%, B: 0 to 0.010%, Nb: 0 to 0.150%, Ti: 0 to 0.20%, Mo: 0 to 3.00%, Cr: 0 to 2.00%, V: 0 to 1.00%, Ni: 0 to 2.00%, W: 0 to 1.00%, Ta: 0 to 0.10%, Co: 0 to 3.00%, Sn: 0 to 1.00%, Sb: 0 to 0.50%, Cu: 0 to 2.00%, As: 0 to 0.050%, Mg: 0 to 0.100%, Ca: 0 to 0.100%, Zr: 0 to 0.100%, Hf: 0 to 0.100%, and REM: 0 to 0.100% in place of part of the balance of Fe. The elements may be 0.0001% or more, 0.0005% or more, or 0.001% or more.

In the base steel sheet, the balance besides the above elements is comprised of Fe and impurities. The "impurities" in the base steel sheet are constituents, etc., entering due to various factors in the production process, first and foremost the ore, scrap, and other materials, when industrially producing the base steel sheet.

The chemical composition of the base steel sheet may be measured by a general analysis method. For example, the chemical composition of the base steel sheet may be measured by removing the plating layer by mechanical grinding, then using inductively coupled plasma-atomic emission spectrometry (ICP-AES). C and S may be measured using the combustion-infrared absorption method, N may be measured using the inert gas melting-thermal conductivity method, and O may be measured by the inert gas melting-nondispersion type infrared absorption method.

[Sheet Thickness of Base Steel Sheet]

The sheet thickness of the base steel sheet is not particularly limited, but for example is 0.2 mm or more and may also be 0.3 mm or more, 0.6 mm or more, 1.0 mm or more, or 2.0 mm or more. Similarly, the sheet thickness of the base steel sheet is, for example, 6.0 mm or less and may also be 5.0 mm or less or 4.0 mm or less.

[Mechanical Properties of Plated Steel Sheet]

The plated steel sheet according to an embodiment of the present invention can have any suitable tensile strength and is not particularly limited, but for example may have a tensile strength 780 MPa or more. For example, in an embodiment of the present invention, the tensile strength of the plated steel sheet may be 980 MPa or more, 1080 MPa or more, or 1180 MPa or more. The plated steel sheet according to an embodiment of the present invention has a high lubrication ability, and therefore even if having such a relatively high tensile strength, it is possible to sufficiently reduce the load in press-forming compared with a conventional plated steel sheet having the same tensile strength and therefore realize the desired press-forming without causing fracture or other trouble. The upper limit is not particularly prescribed, but, for example, the tensile strength of the plated steel sheet may be 2300 MPa or less, 2000 MPa or less, 1800 MPa or less, or 1500 MPa or less. The tensile strength is measured by taking a JIS No. 5 test piece from an orientation at which a long direction of the test piece becomes parallel to the perpendicular direction to rolling of the plated steel sheet and conducting a tensile test based on JIS Z 2241:2011.

[Method of Production of Plated Steel Sheet]

Next, a preferred method of production of the plated steel sheet according to an embodiment of the present invention will be explained. The following explanation is intended to illustrate the characteristic method for producing the plated steel sheet according to an embodiment of the present invention and is not intended to limit the plated steel sheet to one produced by the method of production such as explained below.

The plated steel sheet according to the present invention can, for example, be produced by performing a casting step of casting molten steel adjusted in chemical composition so as to form a steel slab, a hot rolling step of hot rolling the steel slab to obtain a hot rolled steel sheet, a coiling step of coiling the hot rolled steel sheet, a cold rolling step of cold rolling the coiled hot rolled steel sheet to obtain a cold rolled steel sheet, a pretreatment step, an annealing step of annealing the pretreated cold rolled steel sheet, and a plating step of forming a plating layer on the obtained base steel sheet. Alternatively, it is also possible to not coil the steel sheet after the hot rolling step, but perform the cold rolling step as is after pickling. Below, the steps will be explained in detail.

[Casting Step]

The conditions of the casting step are not particularly limited. For example, the casting may be performed by smelting using a blast furnace, electric furnace, etc., followed by performing various secondary refining, then casting using the usual continuous casting, casting using the ingot method, or other method.

[Hot Rolling Step]

The cast steel slab can be hot rolled to obtain a hot rolled steel sheet. The hot rolling step is performed by hot rolling the cast steel slab directly or by cooling once, then reheating it. If reheating, the heating temperature of the steel slab may be, for example, 1100 to 1250° C. In the hot rolling step, usually rough rolling and finish rolling are performed. The temperatures and rolling reductions of the rolling operations may be suitably determined in accordance with the desired metallographic structures and sheet thicknesses. For example, the end temperature of the finish rolling may be 900 to 1050° C. and the rolling reduction of the finish rolling may be 10 to 50%.

[Coiling Step]

The hot rolled steel sheet can be coiled at a predetermined temperature. The coiling temperature can be suitably determined in accordance with the desired metallographic structure, etc. For example, it may be 500 to 800° C. It is also possible impart predetermined heat treatment to the hot rolled steel sheet before coiling or after coiling, then uncoiling. Alternatively, the coiling step need not be performed and the steel sheet may be pickled after the hot rolling step, then subjected to the later explained cold rolling step.

[Cold Rolling Step]

The hot rolled steel sheet can be pickled, etc., then cold rolled to obtain the cold rolled steel sheet. The rolling reduction of the cold rolling can be suitably determined in accordance with the desired metallographic structure or sheet thickness. For example, it may be 20 to 80%. After the cold rolling step, for example, it may be air cooled to cool it down to room temperature.

[Pretreatment Step]

Next, the cold rolled steel sheet may be subjected to a predetermined pretreatment step before annealing. As such a pretreatment step, degreasing treatment can be included. The degreasing treatment, for example, may include running a current through the cold rolled steel sheet in a pH8.0 or more solution (electrolysis treatment). The current density at the time of running the current may be 1.0 to 8.0 $A/dm^2$. The current running time may be 5 to 10 seconds.

[Annealing Step]

The pretreated cold rolled steel sheet is annealed. The holding temperature in the annealing step is preferably 700 to 900° C. If the holding temperature in the annealing step is more than 900° C., the steel sheet surface is formed with an external oxide layer and plateability is liable to decline. The rate of temperature rise up to the above holding temperature is not particularly limited, but may be 1 to 10° C./s. The holding time at the above holding temperature is preferably 10 to 300 seconds, more preferably 80 to 120 seconds. If the holding time is more than 300 seconds, external oxides excessively grow and the plateability is liable to fall. The dew point of the atmosphere in the annealing step is preferably −20 to 10° C., more preferably −10 to 5° C. If the dew point is too low, the surface of the steel sheet will be formed with an external oxide layer and the plateability will sometimes fall. On the other hand, if the dew point is too high as well, similarly the steel sheet surface will be formed with Fe oxides an external oxides and sometimes the plateability will fall. Further, the atmosphere at the annealing step may be a reducing atmosphere, more specifically a reducing atmosphere containing nitrogen and hydrogen, for example a hydrogen 1 to 10% reducing atmosphere (for example, hydrogen 4% and nitrogen balance).

[Plating Step]

Next, in the plating step, at least one surface, preferably both surfaces, of the cold rolled steel sheet (base steel sheet) is formed with a plating layer having the chemical composition and structure explained above. More specifically, the plating step is, for example, performed by hot dip plating using a plating bath adjusted in constituents so that the chemical composition of the plating layer becomes within the range explained above. In the plating step, first, it is extremely important to control the time period from dipping the steel sheet in the plating bath to when starting cooling to more than 6 seconds, preferably 7 seconds or more, then cool from the bath temperature (for example, 420 to 480° C.) down to 370° C. by a cooling gas flow rate of 25000 to 60000 $L/min/m^2$. As the cooling gas, room temperature air, nitrogen, etc., can be used. By satisfying these requirements, it is possible to make the ratio of orientation of the (002) plane of the η phase at the plating layer relatively low, i.e., possible to control the structure to randomized orientations including the (002) plane and the (101) plane of the η phase. For this reason, when measuring the plating layer by X-ray diffraction, it is possible to reliably make the peak intensity I(002) derived from the (002) plane of the η phase and the peak intensity I(101) derived from the (101) plane of the η phase satisfy $0<I(002)/I(101)\leq 1000$.

If explained in more detail, first, the time period from dipping the steel sheet in the plating bath to when starting cooling is controlled to more than 6 seconds, preferably 7 seconds or more, so that an Fe—Al barrier layer is formed relatively greatly at the interface of the steel sheet and the plating layer. By the Fe—Al barrier layer being formed relatively greatly, the Fe—Al barrier layer becomes a bumpy shape, and therefore it is possible to increase the η phase nucleation sites. Next, by cooling from the bath temperature down to 370° C. by an extremely high cooling gas flow rate of 25000 to 60000 L/min/$m^2$, the plating layer can vibrate in the solidification process. The η phase formed from the increased nucleation sites is arranged in various directions due to such vibration whereby it is possible to create randomized orientations including the (002) plane and (101) plane of the η phase. Therefore, it is possible to reliably control the relationship of the peak intensity I(002) derived from the (002) plane of the η phase and the peak intensity I(101) derived from the (101) plane of the η phase to within the range of 0<I(002)/I(101)≤1000. If the time period from dipping the steel sheet in the plating bath to when starting cooling is short, nucleation of the η phase starting from the Fe—Al barrier layer becomes difficult. For this reason, even if cooling by a high cooling gas flow rate after that, it becomes no longer possible to sufficiently create randomized orientations including the (002) plane and (101) plane of the η phase and, as a result, it becomes no longer possible to obtain the desired I(002)/I(101) intensity ratio at the finally obtained plated steel sheet. On the other hand, even if making the time period from dipping the steel sheet in the plating bath to when starting cooling a suitable one causing sufficient nucleation starting from the Fe—Al barrier layer, for example, if the subsequent cooling gas flow rate is low, the plating layer cannot sufficiently vibrate in the solidification process and similarly it becomes no longer possible to obtain the desired I(002)/I(101) intensity ratio at the finally obtained plated steel sheet. Therefore, in the plating step, the combination of "control the time period from dipping the steel sheet in the plating bath to when starting cooling to more than 6 seconds" and "cool from the bath temperature down to 370° C. by a cooling gas flow rate of 25000 to 60000 L/min/$m^2$" is extremely important in controlling the I(002)/I(101) intensity ratio to within a range of more than 0 to 1000 or less.

On the other hand, if the time period from dipping the steel sheet in the plating bath to when starting cooling is too long, a greater amount of Al in the plating layer is consumed for formation of the Fe—Al barrier layer and sometimes the effect of improvement of the lubrication ability by the addition of Al cannot be sufficiently obtained. Therefore, the time period from dipping the steel sheet in the plating bath to when starting cooling is preferably 15 seconds or less. Further, from the viewpoint of randomizing the directions of crystal orientations to better improve the lubrication ability of the plated steel sheet, the cooling gas flow rate from the bath temperature down to 370° C. is preferably greater. For example, by making the cooling gas flow rate from the bath temperature down to 370° C. 37000 L/min/$m^2$ or more, it is possible to control the I(002)/I(101) intensity ratio to a lower value of for example 500 or less and as a result is possible to further improve the lubrication ability of the plated steel sheet. Similarly, for example, by making the cooling gas flow rate from the bath temperature down to 370° C. 50000 L/min/$m^2$ or more, it is possible to control the I(002)/I(101) intensity ratio to a further lower value of for example 50 or less and as a result is possible to further remarkably improve the lubrication ability of the plated steel sheet. The other conditions of the plating step may be suitably set considering the thickness and amount of deposition of the plating layer, etc. For example, by dipping the cold rolled steel sheet in the plating bath, then pulling it out and immediately spraying it by $N_2$ gas or air using the gas wiping method and then cooling it, it is possible to adjust the amount of deposition of the plating layer to within a predetermined range, for example, to within a range of 10 to 170 g/$m^2$ per surface.

Since the Al content in the plating layer is controlled to within a relatively low range of 0.10 to 1.50%, the plated steel sheet produced by the present method of production can secure the effect of improvement of the lubrication ability by addition of Al while reliably suppressing a drop in the chemical convertibility due to the excessive formation of an alumina film, etc. Similarly, since the intensity ratio of the peak intensity I(002) and the peak intensity I(101) is controlled to within a range of 0<I(002)/I(101)≤1000, it is possible to remarkably improve the lubrication ability of the plated steel sheet due to the suitably controlled random orientations of the (002) plane and (101) plane of the η phase. Therefore, according to such a plated steel sheet, it is possible to realize a better lubrication ability and chemical convertibility compared with a conventional plated steel sheet provided with a plating layer having a similar chemical composition, more specifically a Zn-based plating layer having a similar Al content. It is possible to contribute to the development of industry through improvement of the productivity in use as particularly a plated steel sheet for automobile.

Below, examples will be used to explain the present invention in more detail, but the present invention is not limited to these examples in any way.

EXAMPLES

First, molten steels having chemical compositions comprised of, by mass %, C: 0.15%, Si: 1.00%, Mn: 2.60%, P: 0.010%, S: 0.0020%, N: 0.0100%, Al: 0.020%, and balances of Fe and impurities were cast by continuous casting to form steel slabs. The steel slabs were cooled once, then reheated to 1200° C. for hot rolling and then were coiled at 600° C. The hot rolling was performed by rough rolling and finish rolling. The end temperature of the finish rolling was 950° C. and the rolling reduction of the finish rolling was 30%. Next, the obtained hot rolled steel sheets were pickled, then were cold rolled by rolling reductions of 50% to obtain cold rolled steel sheets having sheet thicknesses of 1.6 mm. Next, the obtained cold rolled steel sheets were pretreated (degreased) in a pH9.2 solution by running a current of a 5.0 A/$dm^2$ current density for 8 seconds.

Next, each cold rolled steel sheet was cut to a 100 mm×200 mm size, then was annealed under conditions of a dew point of 0° C., a holding temperature of 870° C., and a holding time of 100 seconds (annealing atmosphere: hydrogen 4% and nitrogen balance). In all of the steel sheet samples, the rate of temperature rise at the time of annealing was 5° C./s. Next, the cut steel sheet sample was plated using a hot dip galvanization bath having a predetermined bath composition (bath temperature: 420 to 480° C.) under conditions of the time period from dipping into the plating bath down to cooling start and the cooling gas flow rate (from bath temperature down to 370° C.) shown in Table 1 to thereby obtain a plated steel sheet sample formed with a plating layer on both surfaces of the steel sheet sample. The amount of plating deposition was adjusted to 50 g/$m^2$ per surface by dipping in the plating bath, pulling up the steel sheet sample, and wiping by $N_2$ gas before starting cooling.

[Analysis of Chemical Composition of Plating Layer]

The chemical composition of the plating layer was determined by dipping a sample cut to 30 mm×30 mm in a 10% HCl aqueous solution containing an inhibitor (Asahi Chemical Co., Ltd., Ibit), peeling off the plating layer by pickling, then measuring the plating constituent dissolved in the aqueous solution by ICP spectrometry. The results are shown in Table 1.

[Tensile Strength of Plated Steel Sheet]

The tensile strength was measured by taking a JIS No. 5 test piece from an orientation at which a long direction of the test piece becomes parallel to perpendicular direction to rolling of the plated steel sheet sample and conducting a tensile test based on JIS Z 2241:2011. As a result, in all of the plated steel sheet samples, the tensile strength was 780 MPa or more.

[Measurement of I(002)/I(101) by X-Ray Diffraction]

The I(002)/I(101) intensity ratio was determined in the following way. First, a plated steel sheet sample cut out from the plated steel sheet to a 50 mm×30 mm size was obtained, then the plated steel sheet sample was measured by X-ray diffraction (apparatus: RINT-TTR3 (Rigaku), tube: Cu, acceleration voltage: 15 kV, steps: 0.1°, 2θ:20 to 60°, analysis software: calculation of integrated intensity, baseline correction: Sonneveld-Visser method). The peak intensity I(002)(cps) of the peak derived from the (002) plane of the η phase detected in the range of 2θ=36.1 to 36.3° and the peak intensity I(101)(cps) of the peak derived from the (101) plane of the η phase detected in the range of 2θ=43.1 to 43.3° were measured and the value of I(002)/I(101) was determined.

[Evaluation of Lubrication Ability]

A 150×30 mm plated steel sheet sample was subjected to a draw bead test to evaluate the lubrication ability of the plated steel sheet. Specifically, first, a plated steel sheet sample was coated with NOX-RUST550NH, then a flat die was pressed against it by a certain pressing load. Next, a tensile tester UST-10T made by Oriental Co., Ltd. was used to draw the sheet by a speed of 100 mm/min and the load required for drawing was measured at room temperature. The sliding distance was 100 mm. The average value of the load required for drawing at a sliding distance of 60 to 100 mm was made the drawing load. The pressing load was changed to 3, 6, and 9 kN. A value of two times the pressing load was divided by the drawing load to find the dynamic friction coefficient between the plated steel sheet sample and the dies. The lubrication ability of the plated steel sheet was evaluated by the following evaluation criteria based on the value of the dynamic friction coefficient.

AAA: dynamic friction coefficient 0.10 to 0.15

AA: dynamic friction coefficient more than 0.15 to 0.20

A: dynamic friction coefficient more than 0.20 to 0.25

B: dynamic friction coefficient more than 0.25

[Evaluation of Chemical Convertibility]

The chemical convertibility of the plated steel sheet was evaluated as follows: First, a 50×100 mm plated steel sheet sample was taken. The plated steel sheet sample was treated by zinc phosphate (SD5350 system: standard made by Nippon Paint Industrial Coatings Co., Ltd.) to form a chemically converted film. Next, the sample surface was examined by a 2D electron image of a SEM and the area ratio of parts where no chemically converted film was formed, generally called "bald spots", was measured. The chemical convertibility of the plated steel sheet was evaluated by the following evaluation criteria based on the area ratio of the bald spots.

AA: bald spot area ratio ratio 0 to 5%

A: bald spot area ratio ratio more than 5 to 15%

B: bald spot area ratio ratio more than 15%

The cases where the lubrication abilities were evaluated as AAA, AA, and A and the chemical convertibilities were evaluated as AA and A were evaluated as plated steel sheets having improved lubrication abilities and chemical convertibilities. The results are shown in the following Table 1.

TABLE 1

| | | Chemical composition of plating layer (mass %) | | | | | Production conditions | | η phase | | |
|---|---|---|---|---|---|---|---|---|---|---|---|
| | | | | | Others | | Time period from dipping in plating bath to start of cooling (s) | Cooling gas flow rate (L/min/m²) | I(002)/I(101) | Lubrication ability | Chemical convertibility |
| No. | Class | Zn | Al | Fe | Element | (mass %) | | | | | |
| 1 | Ex. | Bal. | 0.10 | 0.30 | B | 0.001 | 7 | 25000 | 1000 | A | AA |
| 2 | Ex. | Bal. | 0.25 | 0.40 | Mg | 0.002 | 7 | 25000 | 950 | A | AA |
| 3 | Ex. | Bal. | 0.40 | 0.40 | Y | 0.001 | 7 | 25000 | 770 | A | AA |
| 4 | Ex. | Bal. | 0.45 | 0.30 | Si | 0.002 | 7 | 26000 | 560 | A | AA |
| 5 | Ex. | Bal. | 0.50 | 0.30 | Pb | 0.001 | 7 | 37000 | 500 | AA | AA |
| 6 | Ex. | Bal. | 0.50 | 0.30 | Ni | 0.002 | 7 | 37000 | 500 | AA | AA |
| 7 | Ex. | Bal. | 0.50 | 0.30 | Sb | 0.001 | 7 | 37000 | 500 | AA | AA |
| 8 | Ex. | Bal. | 0.50 | 0.30 | | | 7 | 40000 | 500 | AA | AA |
| 9 | Ex. | Bal. | 0.50 | 0.20 | Sr | 0.010 | 7 | 50000 | 50 | AAA | AA |
| 10 | Ex. | Bal. | 0.50 | 0.30 | Ca | 0.001 | 7 | 50000 | 40 | AAA | AA |
| 11 | Ex. | Bal. | 0.55 | 0.50 | Ce | 0.002 | 7 | 50000 | 40 | AAA | AA |
| 12 | Ex. | Bal. | 0.55 | 0.70 | Pb | 0.001 | 7 | 50000 | 30 | AAA | AA |
| 13 | Ex. | Bal. | 0.55 | 0.70 | Sn | 0.100 | 7 | 50000 | 30 | AAA | AA |
| 14 | Ex. | Bal. | 0.60 | 0.40 | | | 7 | 50000 | 40 | AAA | AA |
| 15 | Ex. | Bal. | 0.60 | 0.50 | P | 0.002 | 7 | 50000 | 50 | AAA | AA |
| 16 | Ex. | Bal. | 0.60 | 0.40 | Cu | 0.001 | 7 | 50000 | 40 | AAA | AA |
| 17 | Ex. | Bal. | 0.80 | 0.50 | Ti | 0.002 | 7 | 50000 | 210 | AA | AA |
| 18 | Ex. | Bal. | 0.90 | 0.20 | Cr | 0.001 | 7 | 50000 | 40 | AAA | AA |
| 19 | Ex. | Bal. | 1.30 | 0.10 | Nb | 0.002 | 7 | 50000 | 30 | AAA | A |
| 20 | Ex. | Bal. | 1.00 | 0.40 | Zr | 0.001 | 7 | 50000 | 20 | AAA | A |
| 21 | Ex. | Bal. | 1.10 | 0.20 | Mn | 0.002 | 7 | 50000 | 20 | AAA | A |
| 22 | Ex. | Bal. | 1.20 | 0.50 | Mo | 0.001 | 7 | 50000 | 20 | AAA | A |
| 23 | Ex. | Bal. | 1.30 | 0.40 | Ag | 0.002 | 7 | 50000 | 10 | AAA | A |
| 24 | Ex. | Bal. | 1.40 | 0.50 | Li | 0.001 | 7 | 50000 | 10 | AAA | A |
| 25 | Ex. | Bal. | 1.50 | 0.60 | La | 0.002 | 7 | 50000 | 20 | AAA | A |
| 26 | Comp. ex. | Bal. | 0.08 | 0.70 | | | 7 | 25000 | 500 | B | A |
| 27 | Comp. ex. | Bal. | 1.60 | 0.50 | | | 7 | 25000 | 500 | A | B |

TABLE 1-continued

| | | Chemical composition of plating layer (mass %) | | | | | Production conditions | | | | |
|---|---|---|---|---|---|---|---|---|---|---|---|
| | | | | | Others | | Time period from dipping in plating bath to start of cooling (s) | Cooling gas flow rate (L/min/m$^2$) | η phase I(002)/I(101) | Lubrication ability | Chemical convertibility |
| No. | Class | Zn | Al | Fe | Element | (mass %) | | | | | |
| 28 | Comp. ex. | Bal. | 0.30 | 0.20 | | | 3 | 25000 | 4020 | B | A |
| 29 | Comp. ex. | Bal. | 0.40 | 0.50 | | | 7 | 22000 | 1100 | B | A |

Underlines indicate outside scope of present invention or production conditions outside preferable range.

Referring to Table 1, in Comparative Example 26, the Al content in the plating layer was low, therefore it was not possible to sufficiently obtain the effect of improvement of the lubrication ability by Al addition and the lubrication ability fell. In Comparative Example 27, the Al content in the plating layer was high, therefore the surface of the plating layer was excessively formed with an alumina film and the chemical convertibility fell. In Comparative Example 28, the time period from dipping into the plating bath down to cooling start was short, therefore it is believed nucleation of the η phase starting from the Fe—Al barrier layer did not sufficiently occur. As a result, it was not possible to sufficiently create the randomized orientations including the (002) plane and (101) plane of the η phase and the lubrication ability fell. In Comparative Example 29, the cooling gas flow rate from the bath temperature down to 370° C. was low, so it is believed it was not possible to sufficiently make the plating layer vibrate in the solidification process. As a result, it was not possible to sufficiently create the randomized orientations including the (002) plane and (101) plane of the η phase and the lubrication ability fell.

In contrast to this, in the plated steel sheets of all of the examples, by having the predetermined plating chemical compositions and controlling the intensity ratio of the the peak intensity I(002) and the peak intensity I(101) to within the range of 0<I(002)/I(101)≤1000, it was possible to secure the effect due to the addition of Al to the plating layer while reliably suppressing the drop in chemical convertibility due to the excessive formation of an alumina film, etc., and possible to improve the lubrication ability of the plated steel sheet by the random orientations in which the (002) plane and the (101) plane of the η phase at the plating layer are suitably controlled. In particular, in each of Examples 5 to 8 and 17 in which the Al content in the plating layer was 0.30% or more and the cooling gas flow rate from the bath temperature to 370° C. was 37000 L/min/m$^2$ or more, the I(002)/I(101) intensity ratio became 500 or less and, as a result, the lubrication ability was evaluated as AA and, further, the lubrication ability of the plated steel sheet was improved. In addition, in each of Examples 9 to 16 and 18 to 25 in which the Al content in the plating layer was made 0.30% or more and the cooling gas flow rate from the bath temperature to 370° C. was 50000 L/min/m$^2$ or more, the I(002)/I(101) intensity ratio became 50 or less and, as a result, the lubrication ability was evaluated as AAA and, further, the lubrication ability of the plated steel sheet was further improved. Further, in each of Examples 1 to 18 in which the Al content in the plating layer was limited to 0.90% or less, the chemical convertibility was evaluated as AA and, further, the chemical convertibility of the plated steel sheet was improved.

The invention claimed is:

1. A plated steel sheet comprising a base steel sheet and a plating layer formed on a surface of the base steel sheet, wherein the plating layer has a chemical composition comprising, by mass %, Al: 0.10 to 1.50% and
Fe: 0.01 to 2.00%,
further comprising at least one of
Mg: 0 to 1.500%,
Si: 0 to 1.000%,
Ni: 0 to 1.000%,
Ca: 0 to 4.000%,
Sb: 0 to 0.500%,
Pb: 0 to 0.500%,
Cu: 0 to 1.000%,
Sn: 0 to 1.000%,
Ti: 0 to 1.000%,
Cr: 0 to 1.000%,
Nb: 0 to 1.000%,
Zr: 0 to 1.000%,
Mn: 0 to 1.000%,
Mo: 0 to 1.000%,
Ag: 0 to 1.000%,
Li: 0 to 1.000%,
La: 0 to 0.500%,
Ce: 0 to 0.500%,
B: 0 to 0.500%,
Y: 0 to 0.500%,
P: 0 to 0.500%, and
Sr: 0 to 0.500% in a total of 5.000% or less, and
a balance of Zn and impurities, and
when measuring the plating layer by X-ray diffraction, a peak intensity I(002) derived from a (002) plane of an η phase and a peak intensity I(101) derived from a (101) plane of the η phase satisfy 20≤I(002)/I(101)≤1000.

2. The plated steel sheet according to claim 1, wherein the chemical composition comprises, by mass %, Al: 0.30 to 1.50% and, when measuring the plating layer by X-ray diffraction, the peak intensity I(002) and the peak intensity I(101) satisfy 20≤I(002)/I(101)≤500.

3. The plated steel sheet according to claim 2, wherein the plating layer is a hot dip galvanized (GI) layer.

4. The plated steel sheet according to claim 1, wherein the chemical composition comprises, by mass %, Al: 0.30 to 1.50% and, when measuring the plating layer by X-ray diffraction, the peak intensity I(002) and the peak intensity I(101) satisfy 20≤I(002)/I(101)≤50.

5. The plated steel sheet according to claim 4, wherein the plating layer is a hot dip galvanized (GI) layer.

6. The plated steel sheet according to claim 1, wherein the plating layer is a hot dip galvanized (GI) layer.

* * * * *